(12) United States Patent
Tatman et al.

(10) Patent No.: US 7,979,031 B2
(45) Date of Patent: Jul. 12, 2011

(54) SYSTEM AND METHOD FOR MAKING MEASUREMENTS IN CUSTOMER DEVICES ACROSS DIFFERENT NETWORK TECHNOLOGIES

(75) Inventors: Lance A. Tatman, Granite Bay, CA (US); Jerry J. Liu, Sunnyvale, CA (US); Glenn R. Engel, Snohomish, WA (US); Glen L Purdy, Jr., Snohomish, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1479 days.

(21) Appl. No.: 11/375,805

(22) Filed: Mar. 14, 2006

(65) Prior Publication Data

US 2007/0218893 A1 Sep. 20, 2007

(51) Int. Cl.
*H04B 17/00* (2006.01)
(52) U.S. Cl. .......... 455/67.11; 455/403; 455/414.1; 455/423; 709/201; 709/202; 709/203; 370/241; 370/252
(58) Field of Classification Search .......... 455/67.11, 455/403, 414.1, 423, 424, 425; 709/201, 709/202, 203, 214, 217, 218; 370/241, 252
See application file for complete search history.

(56) References Cited

U.S. PATENT DOCUMENTS

| | | | |
|---|---|---|---|
| 5,625,668 A | 4/1997 | Loomis et al. | |
| 5,805,666 A | 9/1998 | Ishizuka et al. | |
| 5,987,306 A | 11/1999 | Nilsen et al. | |
| 6,088,588 A | 7/2000 | Osborne | |
| 6,308,071 B1 | 10/2001 | Kalev | |
| 6,434,364 B1 | 8/2002 | O'Riordain | |
| 7,043,237 B2 | 5/2006 | Snyder et al. | |
| 2001/0041566 A1 * | 11/2001 | Xanthos et al. | 455/423 |
| 2001/0049263 A1 | 12/2001 | Zhang | |
| 2002/0069037 A1 | 6/2002 | Hendrickson et al. | |
| 2004/0230965 A1 * | 11/2004 | Okkonen | 717/168 |
| 2005/0174961 A1 * | 8/2005 | Hrastar | 370/328 |
| 2005/0250440 A1 * | 11/2005 | Zhou et al. | 455/12.1 |
| 2006/0234698 A1 * | 10/2006 | Fok et al. | 455/425 |
| 2006/0294244 A1 * | 12/2006 | Naqvi et al. | 709/227 |
| 2007/0041330 A1 * | 2/2007 | Bostica et al. | 370/252 |

FOREIGN PATENT DOCUMENTS

JP 2001127693 5/2001

* cited by examiner

*Primary Examiner* — Tuan H Nguyen

(57) ABSTRACT

In a communication network architecture having multiple technology coverage areas that support different network technologies, a service provider monitors its customer's experience as the customer roams between technology coverage areas. An agent, such as software installed on-board the customer's mobile equipment, measures parameters that are related to the network technology, and communicates the measured parameters to the service provider, over the communication network.

22 Claims, 2 Drawing Sheets

SYSTEM AND METHOD FOR MAKING MEASUREMENTS IN CUSTOMER DEVICES ACROSS DIFFERENT NETWORK TECHNOLOGIES

BACKGROUND

The invention relates to the field of telecommunications, and particularly to wireless communication networks. Among other areas, it has applicability to networks such as GPRS and IDEN, and networks according to the IEEE 802.11 standard.

In a typical communications architecture, users are coupled for communication with one or more nodes, such as base stations, servers, etc., which, in turn, are coupled for communication with public communication networks such as the Internet, and which support technology coverage areas within the network. Communications between such users pass through their respective base stations, and across the public networks. Such users employ mobile equipment, such as laptop or other portable computers, cellular telephones, etc.

A given technology coverage area, is characterized in terms of its network technology. Within such network technology, there will be provided a respective menu of available services and operating parameters. A service provider supporting a given network technology will have access to a lot of data regarding the services provided to its customers. Much of the data will pertain to the supported network technology. The service provider accesses the data by monitoring the various system infrastructure components at the base stations and elsewhere in the network.

Service providers conventionally have used specialized test equipment and performed "drive" tests to measure network performance both inside and outside of their network. Service providers conduct surveys of their customers to understand, for instance, the service level and performance quality provided under other network technologies. Test labs are also set up to simulate the expected environments. However, these methods have had the drawback that they cannot directly measure customer experience.

Service providers conventionally have very limited or no visibility into the performance of the network and services being used by their customers. This can be an important drawback for the service providers, particularly when they begin to roll out services under new networking technologies. At such times, the service providers need information on such performance, in order to handle problems, and otherwise to be responsive to their customers' needs.

This drawback also becomes important as customer equipment gains the capability to "roam," i.e. to move from place to place, into technology coverage areas that support network different technologies offered by the service provider or different technologies from those supported by the service provider. Such other technology coverage areas might employ networking technologies that are different from the service provider's technology, or otherwise outside of the service provider's control. Because of the different technology, the service provider conventionally has little or no insight as to the level of service the customer is receiving in the other technology coverage area.

For instance, a customer of the service provider might use a GPRS mobile phone that is capable of switching between the service provider's GPRS network and an IEEE 802.11x standards-based wireless local area network (LAN). The customer might want to use his/her mobile equipment at a wireless hot-spot, or at the customer's own home located outside the service provider's technology coverage area. The service provider's inability to obtain information directly reflective of the system's performance, as the user experiences it, disadvantageously limits the service provider's ability to provide the customer with effective support.

SUMMARY

The customer's mobile equipment includes an agent, such as a software agent installed on-board the mobile equipment, that measures parameters related to the performance of the mobile equipment in the communication network architecture. The mobile equipment transmits the measured parameters, through the communication network, to the service provider.

In one embodiment, the agent includes parameter storage for accumulating measurements of the parameters, and storing the measurements as the measurements accumulate. In one embodiment, the agent further includes: (i) a sensor for sensing the network technology available as the mobile equipment roams, and (ii) sets of parameters suitable for different network technologies, including a parameter set from which parameters are selected for measurement based on the sensed available network technology. In one embodiment of a method for measuring parameters accessible by mobile equipment which communicates over a communication network, the method comprises sensing the network technology available as the mobile equipment roams, the mobile equipment includes sets of parameters suitable for different network technologies, and the method further comprises selecting a parameter set, from the sets of parameters, for measurement based on the sensed available network technology.

The service provider thus has direct access to the performance of the system from the customer's perspective, and is able to use that information to improve service to the customer. Service providers can have real-time or near real-time data available to understand their customer's experience, when the customer is roaming on another network technology.

Further features and advantages of the present invention, as well as the structure and operation of preferred embodiments of the present invention, are described in detail below with reference to the accompanying exemplary drawings.

GLOSSARY

For the description of the present invention, the following terms shall have the meanings here set forth:

"Base Station" means a network node, server, etc., generally provided and operated by a service provider, for facilitating user communication over a communication network.

"Customer" means an individual or other party who possesses communication equipment, such as a cell phone or laptop computer, and who subscribes with a service provider for network communication services. The terms "user" and "mobile user" are used interchangeably with "customer."

"Home service provider" means, with reference to a given customer, a service provider with which the customer has a subscription for network communication service.

"Mobile equipment" means a piece of equipment, owned or possessed by a customer, having capability of communicating over the communication network, and which the customer can, pursuant to the customer's use of the mobile equipment, transport the mobile equipment from place to place and use it in those respective places. The terms "mobile device" and "mobile equipment" are used interchangeably with "mobile equipment."

"Networking technology" means a communication technology, standard, protocol, format, etc, which a given service provider employs to enable communication over a communication network. Examples of networking technologies include General Packet Radio Service (GPRS) and Integrated Enhanced Digital Network (IDEN).

"Service provider" means a party which maintains equipment and means for transmitting and receiving communications over a communication network, and which offers subscriptions to customers, pursuant to which the customers utilize the service provider's equipment and means for transmitting and receiving, to communicate over the communication network.

"Technology Service Area" means, with reference to a given service provider, a geographical or other area, over which network communication service is provided by the service provider. Typically, communications from customers within the technology service area will be routed through a base station provided and maintained by the given service provider. A given technology service area is characterized in terms of a respective networking technology, that the service provider employs and supports. Generally, a customer's communication equipment will use communication equipment and software that is consistent with the networking technology employed by its home service provider, although the equipment and software may also be able to communicate using other networking technologies.

DETAILED DESCRIPTION

Figure 1:
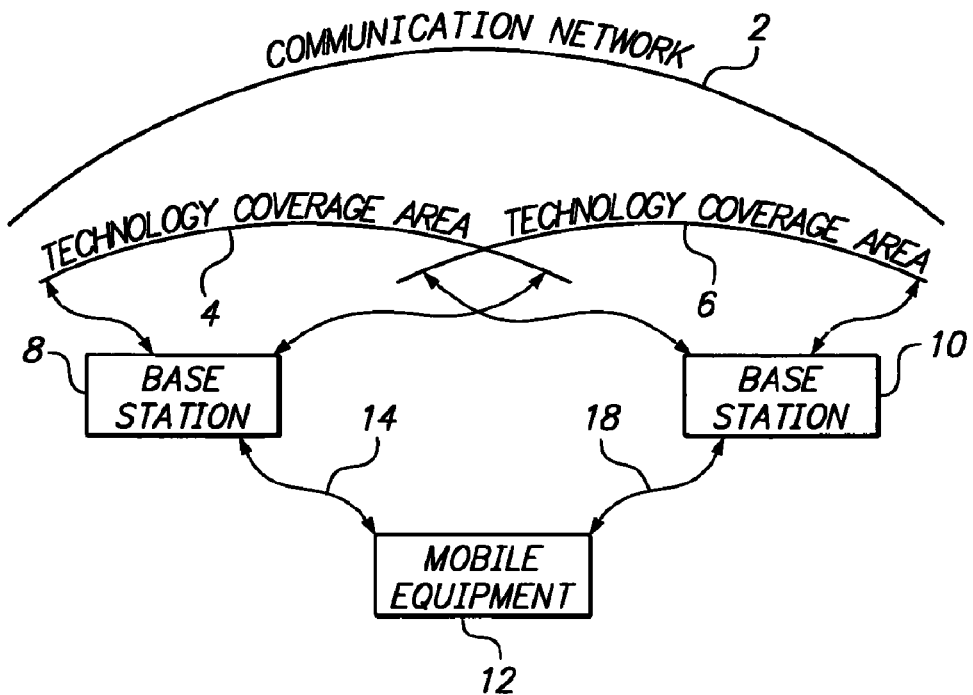
FIG. 1 is a block diagram showing an example of a broadband communications architecture, within which the invention is practiced.

An example of an environment, in which various embodiments of the invention may be practiced, is illustrated by the block diagram of FIG. 1. A communication network 2 covers a region, such as a geographical region, over which first and second service providers provide coverage within respective technology coverage areas 4 and 6. Service provider server equipment, shown as base stations 8 and 10, are provided, within the respective technology coverage areas 4 and 6, to facilitate user communications. Thus, for instance, a customer of the first service provider, while located within the first service provider's technology coverage area 4, communicates with the base station 8 for access to the communication network 2 by means of a wireless or other communication link 14.

For the purpose of describing the invention, the first service provider will be referred to as the "home service provider," as per the definition in the Glossary, above. The base stations 8 and 10 are shown schematically, but it will be understood that they are implemented differently, as appropriate for different service providers who may offer different technology coverage area technologies, menus of services, available parameters, etc.

The customer employs mobile equipment, generally shown as mobile equipment 12. The mobile equipment 12 includes, among its various possible embodiments, a processor, memory, and a wireless communication interface. For instance, the mobile equipment 12 might include a laptop computer, cell phone, handheld "personal digital assistant" unit, or wireless sensor. As shown, the mobile equipment 12 can move from the technology coverage area 4 to the different technology coverage area 6. When it does so, it will, for instance, now communicate with the base station 10, again by means of a wireless or other communication link 18.

The second service provider, who offers service within the technology coverage area 6, may well employ communications technology different from that of the first service provider. Accordingly, a conventional system which can only perform drive tests, will provide a severe under-sampling, in both time and space, of the mobile equipment 12's performance.

Also, such conventional methods did not provide measurements from a customer perspective. That is, the measurements available to the service provider were not necessarily accurately reflective of the performance the mobile equipment 12 actually experienced.

In one embodiment of the invention, measurements are made at the location where the customer is, and at the time when the customer is using the device. The measurements are taken at, or on-board, the mobile equipment 12. Thus, the service provider has clear visibility of their customer's experience, as the customer moves across network technologies. As a consequence, a much better representation of customer experience is provided, than with conventional systems, which do not make this available to the service providers.

An embodiment of the invention includes the following:

A. Software agent installed or installable on the customer device
  1. Agent is capable of communicating with a home provider's server.
  2. Agent is capable of storing measurements for some period of time.
  3. Agent is capable of making measurements useful to the home provider.

B. Server to configure agents and collect data.

Figure 2:
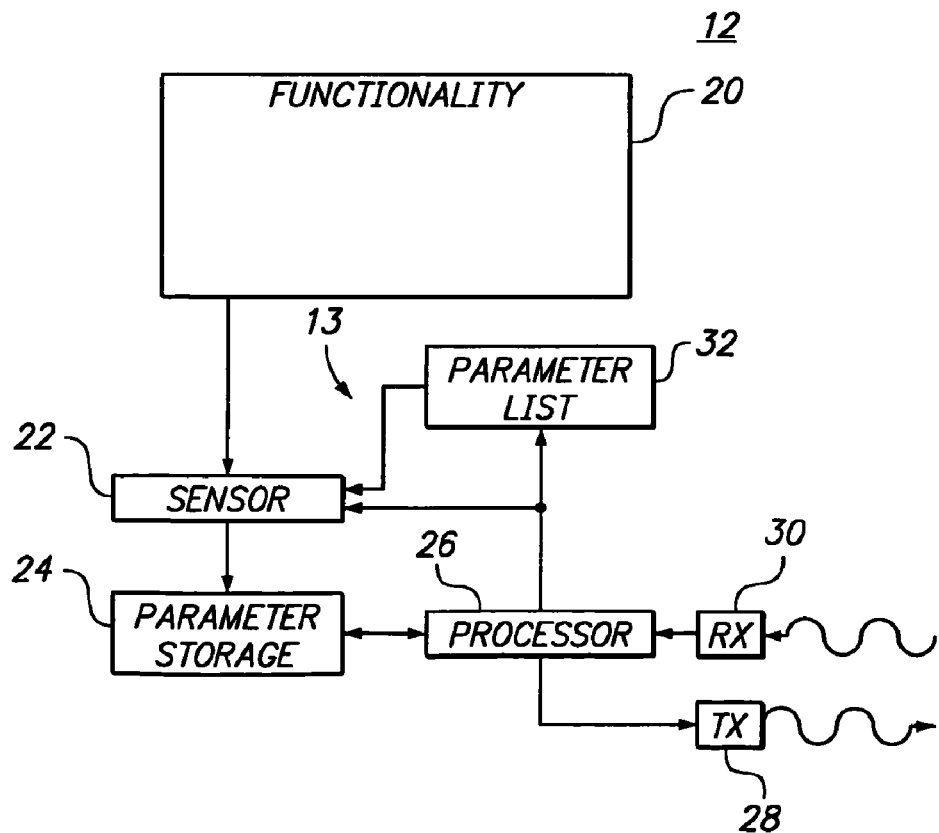
FIG. 2 is a block diagram showing a more detailed implementation of a piece of mobile equipment in accordance with the invention.

FIG. 2 is a block diagram of the piece of mobile equipment 12 of FIG. 1, such as a laptop computer or cell phone, illustrating one embodiment of the agent of the invention.

The mobile equipment 12 has a general functionality 20, whose nature depends on what type of equipment it is. For instance, if the mobile equipment 12 is a laptop computer, its general functionality 20 will include data storage and processing capability, a user interface, etc. A cell phone's general functionality 20 would include voice telecommunications. The embodiment of the invention further includes an agent 13, to be described in detail herebelow.

As the mobile equipment 12 operates, its operating parameters are sensed by a sensor 22, and stored in parameter storage 24. The agent 13 includes a processor 26, which handles the parameters, and transmits them, through a transmit interface 28, over the communication network. The sensor 22 can include a hardware sensor, a software implementation for obtaining the sensed parameter values, or a suitable combination of both.

In another embodiment of the invention, the agent 13 includes the ability to sense the technology employed in the technology coverage area within which the mobile equipment 12 is located. Referring again to FIG. 2, a receive interface 30 receives signals from the network, which can be used to identify the technology employed within the technology coverage area. The signals are provided to the processor 26, which interprets the signals appropriately, to identify the technology employed. The processor 26 then accesses a parameter list 32, which contains sets of parameters that are appropriate for various coverage area technologies, such as GPRS and IEEE 802.11 standards-based protocols. The processor 26 then configures the sensor 22, to receive the sensed parameter signals that are appropriate for the technology used in that technology coverage area.

Figure 3:
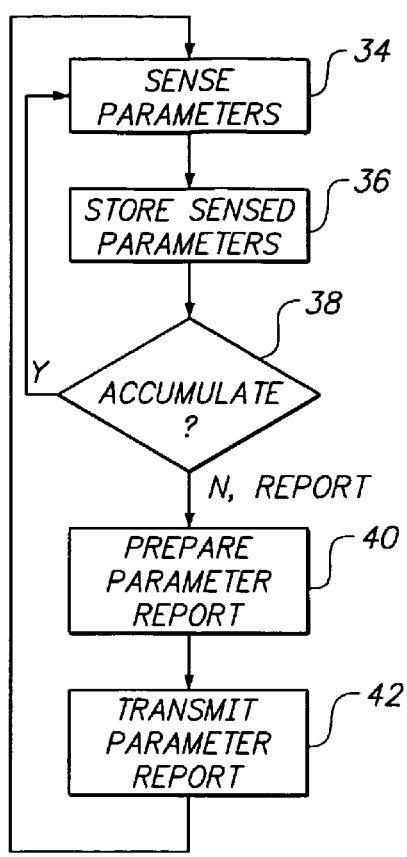
FIG. 3 is a flowchart showing operation of a method according to the invention.

FIG. 3 is a flowchart, showing operation of the agent 13 of the mobile equipment 12. In a step 34, the parameters are sensed (for instance, by the sensor 22). In a step 36, the sensed parameters are stored (for instance, in the parameter storage 24).

While the mobile equipment is in the technology coverage area 4, sensed parameters from the mobile equipment 12 are reported from the mobile equipment 12 to the home service provider, via its base station 8 and the communication network 2. While the mobile equipment is outside of the technology coverage area 4, the sensed parameters from the mobile equipment 12 are reported from the mobile equipment 12 to the home service provider, via the equivalent of the base station 8 for the current technology coverage area. In either case, this may be done at specified time intervals, in response to predetermined values of predetermined parameters when the predetermined values are sensed, in response to a request from the service provider's server equipment, accumulation of a predetermined quantity of parameters, the detection of a change in network technology such as by crossing a technology coverage area boundary, or at other times which the system architect may choose.

For instance, in the implementation of FIG. 3, the parameters are accumulated until one of the above-stated conditions is met. This is tested for, in step 38. If it is not yet time to send the parameter report, then step 34 performs additional parameter sensing.

If it is time to send a report, then the agent 13 prepares a parameter report (step 40). For instance, in one embodiment the processor 26 prepares the parameter report, by following its pre-programmed instructions and/or the agent 13's configuration settings. Preparing the parameter report may include packaging the sensed parameters into a data packet for transmission. pre-processing the parameters, etc. Pre-processing may include summarizing the sensed parameters, calculating statistics, averaging, flagging noteworthy sensed parameter values, etc.

The parameter report is then transmitted (step 42), for instance through the transmit interface 28. In a preferred embodiment, the agent 13 continues sensing the parameters, storing and accumulating the sensed parameters, etc., by again executing step 34.

Figure 4:
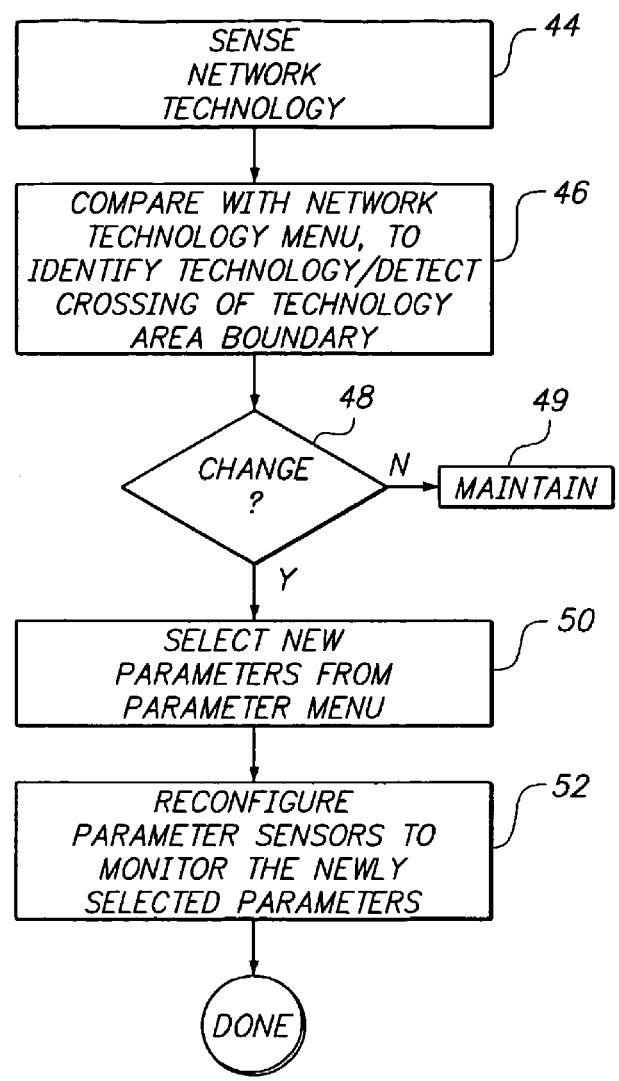
FIG. 4 is a flowchart showing operation of a method according to the invention.

FIG. 4 is a flowchart showing additional functionality of the agent 13, to be performed by the mobile equipment 12. FIG. 4 is an embodiment of functionality which allows the mobile equipment 12 to sense information about the technology coverage area, such as changes in the communication technology, as the mobile equipment 12 roams from one technology coverage area to another (as shown in FIG. 1). Responsive to the sensed change in technology coverage area, the agent 13 changes the parameters it senses. The agent 13 may also change the frequency of testing.

In step 44, the agent 13 senses the network technology employed in the technology coverage area. This is done by known methods, such as by monitoring broadcast signal traffic and analyzing it for content and formats characteristic of a particular network technology, by receiving and interpreting broadcast transmitter identification signals, etc. Such broadcast signals are, for instance, received at the receive interface 30, and interpreted by the processor 26 in accordance with its programmed instructions. Alternatively, the agent 13 reads an Application Programming Interface (API) from the mobile equipment 12, to identify the new technology coverage area.

In step 46, the agent 13 uses the sensed signals to determine what technology is supported in the technology coverage area in which the mobile equipment 12 is currently located. Preferably, a comparison is done between the currently detected network technology, and network technology previously detected. If there is no difference (step 48), then the agent 13 maintains the current parameter configuration (step 49), and continues to operate as before. If there is a difference, then the agent 13 concludes that the mobile equipment 12 has moved from one technology coverage area into another. Alternatively, the mobile equipment 12 reads an Application Programming Interface (API), to find out what technology is now being used.

The agent 13 then consults the parameter list 32, to determine what parameters are to be sensed and/or changed in the new technology coverage area (step 50). The agent 13 then reconfigures the sensor 22, as appropriate, to begin sensing the parameters that are appropriate for the new technology coverage area (step 52). In addition to different parameters, the agent 13 may also employ additional code modules that are activated responsive to detection of such new technology.

In another embodiment, the agent 13 may receive new parameters, new code modules, etc., from outside the mobile equipment 12, such as by receiving suitable communications through the receive interface 30.

Afterwards, the agent 13 resumes sensing parameters. In a preferred embodiment, the agent 13 performs the process of FIG. 3 continuously, as a background or base level task. It executes the process of FIG. 4 according to an appropriate schedule. For instance, the process of FIG. 4 could be executed following step 42 of FIG. 3, before looping back to step 34. Alternatively, FIG. 4 could be called and executed as a subroutine, at regular intervals after an elapsed predetermined time interval. If supported by the mobile equipment 12, the mobile equipment 12 can actively notify the agent 13 when it enters a new technology coverage area, via a callback API.

Assuming a service provider has already installed software agents on its customer devices, the agent 13 can be configured to make measurements continuously at intervals, or do so when the customer uses the device. For example, measurements that may be taken by an agent within a GPRS network include, but are not limited to:

Length of time software applications are in the foreground (applications such as a Web browser, an e-mail tool, phone, etc.)

General Packet Radio Service (GPRS) state

Packet Data Protocol (PDP) state

Transmission Control Protocol (TCP) Cold Connect time

TCP warm connect time

E-mail one-way delay

Wireless Application Protocol (WAP) and Hypertext Markup Language (HTML) page download time User Datagram Protocol (UDP) cold round trip time UDP warm round trip time Global Messaging Service (GMS) and/or Multimedia Messaging Service (MMS) one-way delay TCP transmit rate TCP receive rate Signal strength in dBm Percentage of battery power remaining Absolute radio frequency channel number (ARPCN)

Base station identity code (BSIC)
Cell Identity
Routing area code (RAC)
Time and/or Date
Geographical Location Different measurements can be taken, and would be needed for different networking technology. For example, for IDEN networks, the following are examples of measurements that may be taken:

Home Mobile Country Code
Home National Describer Code
International Mobile Equipment Identity
Signal Quality Estimate Level.

As described above, the agent 13 is senses the technology being used, and changes the measurements to be appropriate for the technology being used.

As the customer goes about his/her business, their mobile device will be taking measurements and either storing them on the device for later transmission to the Operational Support System (OSS) server, or it will be transmitting the measurements at particular intervals, using the network 2 as the communications medium.

As the customer moves out of one technology coverage area into another, the device automatically switches over to make the appropriate measurements for the new network technology. Conventionally, for example, if a piece of GPRS mobile equipment roams into an 802.11 standards-based technology coverage area, the provider would normally be blind to the performance the customer is experiencing.

However, because the measurements are being taken from the mobile equipment 12, the customer is independent of the network, and the measurements can be provided back to the home service provider's OSS system. This data may be used by the home service provider for many different applications, such as verification of network service performance or planning for extension to network coverage.

Because these agents may be employed on a large number of mobile devices, some implementations likely will encounter issues with scaling. Conventionally, installing agents on all of a service provider's customer devices would lead to a solution that could not scale. Also, because the agents will reside on consumer devices, there will be issues with privacy. Systems and methods which include embodiments of the present invention may advantageously address these issues, by employing techniques, such as those disclosed in the patent applications here listed:

Ser. No. 10/047,240 Method and System for Improved Monitoring Measurement and Analysis of Communication Networks Utilizing Dynamically and Remotely Configurable Probes Ser. No. 10/736,653 Wireless Probe Management System Ser. No. 11/230,774 Technique for Management Allowing Anonymous Probe Configuration Allowing Anonymous Probe Identity Ser. No. 11/230,895 Selective Distribution Of Measurement Device Behavior In a Loosely Coupled Autonomous System Ser. No. 09/884,353 Configuring Devices Using Server Responses Ser. No. 10/698,292 Bandwidth Management Using Statistical Measurement Ser. No. 10/306,940 Systems and Methods for Measurement and/or Control Using Mobile Probes Ser. No. 10/829,091 Methods and devices for configuring mobile applications based on specifications defining regions in multidimensional coordinates.

Ser. No. 09/020,630 Transducers with Electronic Data Sheets That Enable Transducer Access Using Multiple Type of Transducer Object Models Ser. No. 10/909,051 Method and System for Treating Events and Data Uniformly Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A parameter measurement system, for measuring parameters of operation of mobile equipment which communicates over a communication network, the communication network including first and second technology coverage areas, the system comprising: an agent, comprising: means for measuring selected parameters of operation of the mobile equipment within one of the first and second technology coverage areas; means for detecting a change of technology coverage area; means for changing the selected parameters to measure parameters appropriate for the detected change of technology coverage area; and means for transmitting the measured parameters over the communication network; wherein the agent further includes: (i) a sensor for sensing the network technology available as the mobile equipment roams, and (ii) sets of parameters suitable for different network technologies, including a parameter set from which parameters are selected for measurement based on the sensed available network technology.

2. A parameter measurement system as recited in claim 1, wherein the mobile equipment includes a processor, memory, and a wireless communication interface.

3. A parameter measurement system as recited in claim 2, wherein the mobile equipment includes one of (i) a cellular telephone, (ii) a portable computer, (iii) a handheld personal digital assistant unit, and (iv) a wireless sensor.

4. A parameter measurement system as recited in claim 1, wherein the agent is included within the mobile equipment.

5. A parameter measurement system as recited in claim 1, wherein the agent includes parameter storage for accumulating the measured parameters, and storing the measured parameters as the measured parameters accumulate.

6. A parameter measurement system as recited in claim 5, wherein the agent stores the accumulated measured parameters for one of (i) a predetermined period of time, (ii) until a predetermined quantity of the measured parameters have been accumulated, and (iii) until a change in technology is detected.

7. A parameter measurement system as recited in claim 1, wherein the agent further comprises a processor for preprocessing the measured parameters before transmitting the measured parameters.

8. A parameter measurement system as recited in claim 1, wherein the agent further comprises a transmitter for transmitting the measured parameters over the communication network, responsive to a received request for transmission of the measured parameters.

9. A parameter measurement system as recited in claim 1, wherein the agent further comprises a selector for selecting parameters for measurement, responsive to one of (i) a received command to do so; and (ii) an elapsed time.

10. A parameter measurement system as recited in claim 1, further comprising a service provider which is coupled for communication with the mobile equipment over the communication network, and which receives the measured parameters.

11. A parameter measurement system as recited in claim 10, wherein the service provider includes a node, coupled to the communication network to receive the measured parameters transmitted from the agent.

12. A method for measuring parameters of operation of mobile equipment which communicates over a communication network, the communication network including first and second technology coverage areas, the method comprising: measuring selected parameters of operation of the mobile equipment within one of the first and second technology coverage areas; detecting a change of technology coverage area; changing the selected parameters to measure parameters appropriate for the detected change of technology coverage area, and transmitting the measured parameters over the communication network; wherein: the method further comprises sensing the network technology available as the mobile equipment roams, the mobile equipment includes sets of parameters suitable for different network technologies, and the method further comprises selecting a parameter set, from the sets of parameters, for measurement based on the sensed available network technology.

13. A method as recited in claim 12, wherein the mobile equipment includes a processor, memory, and a wireless communication interface.

14. A method as recited in claim 13, wherein the mobile equipment includes one of (i) a cellular telephone, (ii) a portable computer, (iii) a handheld personal digital assistant unit, and (iv) a wireless sensor.

15. A method as recited in claim 12, wherein the mobile equipment performs the measuring and the transmitting.

16. A method as recited in claim 12, further comprising accumulating the measured parameters, and storing the measured parameters as the measured parameters accumulate.

17. A method as recited in claim 16, wherein storing includes storing the accumulated measured parameters for one of (i) a predetermined period of time, (ii) until a predetermined quantity of the measured parameters have been accumulated, and (iii) until a change in technology is detected.

18. A method as recited in claim 12, further comprising preprocessing the measured parameters; and transmitting the preprocessed measured parameters.

19. A method as recited in claim 12, further comprising transmitting the measured parameters over the communication network, responsive to a received request for transmission of the measured parameters.

20. A method as recited in claim 12, further comprising selecting parameters for measurement, responsive to one of (i) a received command to do so; and (ii) an elapsed time.

21. A method as recited in claim 12, wherein:
a service provider is coupled for communication with the mobile equipment over the communication network; and
the method further comprises the service provider receiving the measured parameters.

22. A method as recited in claim 21, wherein:
the service provider includes a node coupled to the communication network; and
the method further comprises the node receiving the measured parameters transmitted from the agent.

* * * * *